3,360,379
PROCESSES FOR MAKING WHOLE
CRANBERRY SAUCE
Stanley I. Skelskie, Brockton, Mass., assignor to Ocean Spray Cranberries, Inc., Hanson, Mass., a corporation of Delaware
No Drawing. Filed Mar. 2, 1965, Ser. No. 436,635
3 Claims. (Cl. 99—129)

ABSTRACT OF THE DISCLOSURE

Whole cranberries are cooked with a novel additive to form a jelled cranberry sauce. The additive consists of hot water-reconstituted cranberry pulp which remains as a residue from a press extraction of natural juices from superior grade cranberries. The additive in unscreened, screened or comminuted form, provides pectin for, and fortifies the color of, the final sauce without including in the additive cold-extractable natural juices which have been previously extracted from the cranberries forming the source of the additive for commercial use in the manufacture of cranberry cocktail.

---

This invention relates to the preparation of cranberries for marketing and more specifically to a system for preparing an improved whole berry cranberry sauce with the use of a novel process and novel additive.

Historically, the cranberry crop destined for commercial processing was segregated into a best grade processed to form a whole berry cranberry sauce and a second grade processed to form a jellied strained sauce. Recently, however, cranberry juice cocktail has gained in popularity to such an extent that today there are fewer and fewer of the best grade of cranberries available for the preparation of whole berry cranberry sauce, since the cranberry juice cocktail must have deep color and flavor which can be derived naturally only from the use of best grade cranberries. To use other than the best grade cranberries in cranberry juice cocktail would degrade the product.

Accordingly, it is the primary object of this invention to lessen the requirement of whole cranberries to be used in each batch of whole berry cranberry sauce and to further improve the existing whole berry cranberry sauce by the inclusion of additional natural cranberry pectin, color, flavor and soluble solids.

Thus, in accordance with this invention, cranberries are sorted as at present to segregate those cranberries with high natural color and flavor which are the cranberries required for whole berry cranberry sauce and for cranberry juice cocktail. This selected grade of cranberries is then processed in the usual cocktail manner, for example as described in Patent No. 3,023,108, with or without cyclic pre-freezing as therein described. Such processing involves pressing the cranberries to a low liquid content as in a Carver Press at room temperature and under pressures up to 4,000 p.s.i., leaving a moist pulp which is presently discarded for lack of any commercial utility.

It has now been found that considerable cranberry values, including pectin, color, flavor and soluble solids remain in these presently discarded pressed cranberries, and that these values can be made available by reconstituting the pressed cranberries with water at a temperature of 185° F. to 212° F.; and that such hot soluble values, when utilized in the preparation of whole berry cranberry sauce, decidedly upgrade the resulting sauce with respect to color, flavor and consistency, without unduly thinning the sauce, and lessen the weight of whole cranberries required per unit of production.

A cranberry processing system is thus provided which incorporates into whole cranberry sauce an amount of a novel additive in the form of pressed cranberries, deprived of most of their natural juices, reconstituted in hot water, thereby extending the total amount of marketable processed cranberry products produced from a given lot of high grade berries.

EXAMPLE I

Raw cranberries are sorted according to present day methods to segregate the best grade, being cocktail, whole sauce, and fresh berry grade, comprising berries of high natural red color and flavor, from the remainder which are secondary or strained sauce grade having less natural red color and flavor.

100 grams of the best grade raw cranberries were crushed at room temperature in a Carver Press to extract 75–80 cc. of cold soluble natural cranberry juice which was subsequently diluted with water and sweetened with sugar to provide a deep crimson red marketable cranberry cocktail.

The pressed cranberries, in the form of a low liquid content crushed pulp, amounting to 20–25 grams, were then placed in a kettle with 100 cc. of water and brought to 185° F.–212° F. The mix attained a true cranberry color. Skins and seeds were removed by passing the mix through a No. 0.027"–0.033" screen leaving a puree in the form of a strained aqueous suspension of cooked residue of crushed cranberries.

95 grams of best grade raw whole cranberries were then mixed with 125 grams of sugar-corn syrup solution simultaneously adding 20 grams of the cooked pressed strained cranberry puree (the equivalent of approximately 5 grams of low liquid content pressed cranberries). The mixture was then brought to the boiling point as rapidly as possible, for example, as described in U.S. Patent No. 3,023,108. The resulting sauce was then placed into cans, sealed and water cooled to 100° F. The soluble solids content of the jellied product was 38%.

The resultant product had a deeper red color, better flavor and consistency than a whole sauce prepared to the same soluble solids content by the same process, but lacking the added pressed cranberry puree, despite the fact that the cranberry content did not include the 75–80 cc. of cold-soluble natural juices.

EXAMPLE II

The procedure set forth in Example I was followed, except that the average size of the particles contained in the pressed cranberry and water mix was reduced by passing the mix through a comminutor instead of screening.

EXAMPLE III

The procedure set forth in Example I was followed, except that the skins and seeds were not removed from the cooked pressed cranberry mix.

As can be seen, the above system gives the processor the abiity to secure deeper and more uniform color and uniformity of gel strength in runs of whole cranberry sauce, since the final appearance and texture is markedly controlled by the amount of added reconstituted extract in the pressed cranberry mix. Generally the ratio of whole berries to crushed berries subsequently made into puree is about 95:5 by weight, but can vary widely according to particular requirements of a whole berry sauce product.

Usually, the poorer the color and pectin content of the whole berries, the more pressed cranberry is used.

However, even when the whole berries have satisfactory color and pectin content, the puree of this invention may be used to provide additional pectin, and avoid the necessity for rupturing (mechanically, as in U.S. Patent No. 3,023,108, or by heat, as is common in present-day practice) part of the whole berries to release their pectin content.

What is claimed is:

1. In the manufacture of whole cranberry sauce, the improvement which comprises treating pulp obtained from cold pressed cranberries with hot water to extract hot-soluble pectin, color, flavor and solids therefrom, adding said hot-soluble pectin, color, flavor and solids to a mixture of whole raw cranberries and a sugar syrup, and thereafter cooking the mixture.

2. The improvement as claimed in claim 1 wherein the pulp treating step comprises immersing and cooking the pulp in hot water and wherein the cooked residue which includes said hot-soluble pectin, color, flavor and solids and other insoluble cranberry solids is added to the cranberry-sugar syrup mixture.

3. The improvement as claimed in claim 2 wherein the cooked residue is treated to reduce the average particle size of said other insoluble cranberry solids before being added to the cranberry-sugar syrup mixture.

References Cited
UNITED STATES PATENTS

| | | | |
|---|---|---|---|
| 3,023,108 | 2/1962 | Anderson | 99—103 |
| 3,142,577 | 7/1964 | Anderson | 99—129 |

OTHER REFERENCES

Tressler et al.: Fruit and Vegetable Juice Production, 1954, Air Public Co., pp. 592–594.

A. LOUIS MONACELL, *Primary Examiner.*

M. VOET, *Assistant Examiner.*